(12) United States Patent
Tong et al.

(10) Patent No.: US 10,215,927 B2
(45) Date of Patent: Feb. 26, 2019

(54) ALIGNMENT SYSTEM AND METHOD FOR CALIBRATING POSITION OF OPTICAL FIBER BORE FERRULE

(71) Applicant: CommScope Telecommunications (shanghai) Co. Ltd., Shanghai (CN)

(72) Inventors: Zhaoyang Tong, Shanghai (CN); Lin Lin, Shanghai (CN); Lei Liu, Shanghai (CN)

(73) Assignee: CommScope Telecommunications (Shanghai) Co. Ltd., Shanghai (CN)

( * ) Notice: Subject to any disclaimer, the term of this patent is extended or adjusted under 35 U.S.C. 154(b) by 145 days.

(21) Appl. No.: 15/111,727

(22) PCT Filed: Jan. 6, 2015

(86) PCT No.: PCT/IB2015/050100
§ 371 (c)(1),
(2) Date: Jul. 14, 2016

(87) PCT Pub. No.: WO2015/107435
PCT Pub. Date: Jul. 23, 2015

(65) Prior Publication Data
US 2016/0334583 A1    Nov. 17, 2016

(30) Foreign Application Priority Data

Jan. 14, 2014  (CN) .......................... 2014 1 0016577.1

(51) Int. Cl.
*G02B 6/38* (2006.01)
*H04N 5/247* (2006.01)

(52) U.S. Cl.
CPC ......... *G02B 6/3843* (2013.01); *G02B 6/3885* (2013.01); *H04N 5/247* (2013.01)

(58) Field of Classification Search
CPC ..... G02B 6/3843; G02B 6/3885; H04N 5/247
(Continued)

(56) References Cited

U.S. PATENT DOCUMENTS 4,645,296 A * 2/1987 Cattin .................. G02B 6/3803
385/137
5,271,076 A * 12/1993 Ames ....................... G02B 6/32
359/900
(Continued)

FOREIGN PATENT DOCUMENTS

CN          1197930 A      11/1998
DE       38 33 275 A1      4/1990
(Continued)

*Primary Examiner* — Zaihan Jiang
(74) *Attorney, Agent, or Firm* — Merchant & Gould P.C.

(57) ABSTRACT

The present invention discloses an alignment system for calibrating a position of an optical fiber (30) in a bore (31) of a ferrule (20), comprising: a calibration ferrule (200) having an alignment guide hole (201) formed therein; an alignment guide element (100) for calibrating a center position of a guide hole (21) of the ferrule, so that a center of the guide hole (21) of the ferrule (20) is aligned with a center of the alignment guide hole (201); a fiber core alignment element (300) comprising a fiber core (302) having a center positioned at a theoretical center relative to a positioning reference defined by the center of the alignment guide hole (201); an optical vision system for identifying a center position of a fiber core (32) of the optical fiber (30) and the center position of the fiber core (302) of the respective fiber core alignment element (300); and a controlling and moving system for actively adjusting the position of the optical fiber (30) in the bore (31) of the ferrule (20) under the guide of the optical vision system, so that the center of the fiber core (32) of the optical fiber (30) is aligned with the center of the fiber core (302) of the respective fiber core alignment element (300), and so that the center of the fiber core (32) of the optical fiber (30) is positioned at a theoretical center relative to a positioning reference defined by the center of the guide hole (21) of the ferrule (20).

19 Claims, 5 Drawing Sheets

(58) Field of Classification Search
 USPC .......................................................... 348/95
 See application file for complete search history.

(56) References Cited

U.S. PATENT DOCUMENTS

| | | | | |
|---|---|---|---|---|
| 5,371,814 | A * | 12/1994 | Ames | G02B 6/32 |
| | | | | 385/25 |
| 5,734,768 | A * | 3/1998 | Kim | G02B 6/3803 |
| | | | | 385/52 |
| 6,464,408 | B1 * | 10/2002 | Nolan | G02B 6/3807 |
| | | | | 385/56 |
| 6,742,936 | B1 * | 6/2004 | Knecht | G02B 6/3833 |
| | | | | 385/52 |
| 2004/0042732 | A1 | 3/2004 | Bruns | |
| 2005/0141817 | A1 * | 6/2005 | Yazaki | G02B 6/3825 |
| | | | | 385/78 |
| 2014/0044395 | A1 * | 2/2014 | Waldron | G02B 6/38 |
| | | | | 385/60 |
| 2014/0219612 | A1 * | 8/2014 | Butler | G02B 6/4267 |
| | | | | 385/78 |
| 2015/0355415 | A1 * | 12/2015 | Cline | G02B 6/3672 |
| | | | | 385/83 |
| 2016/0041347 | A1 * | 2/2016 | Hodge | G02B 6/3854 |
| | | | | 385/84 |
| 2017/0242202 | A1 * | 8/2017 | Xie | G02B 6/3672 |

FOREIGN PATENT DOCUMENTS

| | | | | |
|---|---|---|---|---|
| JP | 2005062338 A | 3/2005 | | |
| WO | WO2004017115 A1 * | 7/2002 | .............. | G02B 6/38 |
| WO | 2004017115 A1 | 2/2004 | | |

\* cited by examiner

ALIGNMENT SYSTEM AND METHOD FOR CALIBRATING POSITION OF OPTICAL FIBER BORE FERRULE

This application is a National Stage Application of PCT/IB2015/050100, filed 6 Jan. 2015, which claims benefit of Serial No. 201410016577.1, filed 14 Jan. 2014 in China and which applications are incorporated herein by reference. To the extent appropriate, a claim of priority is made to each of the above disclosed applications.

BACKGROUND OF THE INVENTION

Field of the Invention

The present invention relates to an alignment system and a method for calibrating a position of an optical fiber in a bore of a ferrule, a fiber optic ferrule assembly and a fiber optic connector manufactured by the alignment system and the calibrating method.

Description of the Related Art

A ferrule for a fiber optic connector is a high precision element manufactured by a precise machining technology, and the ferrule is a core component of the fiber optic connector. In prior art, steps of manufacturing the fiber optic connector generally comprises: obtaining a bare fiber by peeling an optical cable and cleaning the bare fiber; inserting the bare fiber through a bore of the ferrule in which gel is prefilled; curing the gel to fix the bare fiber in the bore of the ferrule; and processing the ferrule and the fiber by grinding, polishing, testing, etc., to form a ferrule assembly. A manufacturing error is unavoidable during manufacturing the ferrule assembly. Furthermore, a personal error may be occurred in size for easily fitting/assembling the ferrule assembly, for example, in order to easily insert the fiber through the bore of the ferrule, the diameter of the bore of the ferrule is formed to be larger than the outer diameter of the fiber, causing a size deviation between the outer diameter of the fiber and the diameter of the bore. Thereby, it is likely to occur various errors in the ferrule assembly, for example, a center axis of the fiber is offset from a center axis of the bore of ferrule, a position of the bore is offset from an ideal position of the bore determined with reference to an indexing feature (for example, an outer cylinder of a single-fiber ferrule or a guide hole of a multi-fiber ferrule). As a result, an actual center axis of the fiber in the bore of the ferrule may be offset from an ideal center axis of the fiber determined with reference to the indexing feature of the ferrule due to these errors, increasing the insertion loss of coupling a pair of fiber optic connectors and decreasing the optical transmission performance of the fiber optic connectors.

A mode field diameter of a single-mode fiber is much less than a mode field diameter of a multi-mode fiber. Generally, the mode field diameter of the single-mode fiber is equal to about ⅕ or ⅙ of the mode field diameter of the multi-mode fiber. Thereby, the alignment accuracy of the single-mode fiber is required to be much higher than that of the multi-mode fiber. Accordingly, the precision of the ferrule for the single-mode fiber optic connector is much higher than that of the ferrule for the multi-mode fiber optic connector.

Accordingly, in prior art, in order to ensure the single-mode fiber optic connector to satisfy with the above precision requirements, it is necessary to use the high precision single-mode ferrule to manufacture the high precision single-mode fiber optic connector, and it is impossible to use the low precision multi-mode ferrule to manufacture the high precision single-mode fiber optic connector. That is, during manufacturing the high precision single-mode fiber optic connector, it is necessary to differentiate the high precision single-mode ferrule and the low precision multi-mode ferrule. Although the single-mode single bore ferrule and the multi-mode single bore ferrule (plurality of bores) both have the same outer appearance and almost same in structure, the single-mode single bore ferrule has a much higher precision requirement than that of the multi-mode single bore ferrule. For example, for the single-mode single bore ferrule, the requirement on centricity between the bore of ferrule and the outer cylinder of the ferrule is very high, generally required to reach within 1.5 μm, or even required to less than 1 μm for the single-mode fiber optic connector with an ultralow insertion loss; and for the single-mode multi-bore ferrule, the requirement on the precision of the diameter of the bore of the ferrule and the position accuracy of the bore with respect to the guide hole of ferrule is very high, generally required to reach within 3.0 μm, or even required to less than 1 μm for the single-mode fiber optic connector with an ultralow insertion loss.

The precision requirements on the single-mode multi-bore ferrule mainly comprise a high size precision on the diameter of the bore of the ferrule, a high size precision on a diameter of a guide hole/rod of the ferrule and a high position accuracy of the bore with respect to the guide hole/rod of ferrule. Hereafter, it will compare the single-mode multi-bore ferrule and the multi-mode multi-bore ferrule on following precision requirements.

1) Dimensional tolerance on the guide hole/rod of the ferrule.

For the single-mode ferrule, the dimensional tolerance of the diameter of the guide rod of the ferrule is generally required to reach about a range of −0.0005 mm~0.0005 mm, the dimensional tolerance of the diameter of the guide hole of the ferrule is generally required to reach about a range of −0.001 mm~0.001 mm; for a low insertion loss single-mode ferrule, the dimensional tolerance of the diameter of the guide rod of the ferrule is even required to reach about a range of −0.0001 mm~0.0001 mm, the dimensional tolerance of the diameter of the guide hole of the ferrule is even required to reach about a range of −0.0003 mm~0.0003 mm.

For the multi-mode ferrule, the dimensional tolerance of the guide rod/hole of the ferrule is generally required to reach about a range of −0.001 mm~0.001 mm.

2) Dimensional tolerance on the diameter of the bore of the ferrule.

For the single-mode ferrule, the dimensional tolerance of the diameter of the bore of the ferrule is generally required to reach about a range of −0.00075 mm~0.00075 mm, or even required to reach about a range of −0.0003 mm~0.0003 mm for a low insertion loss single-mode ferrule.

For the multi-mode ferrule, the dimensional tolerance of the diameter of the bore of the ferrule is generally required to reach about a range of −0.001 mm~0.001 mm.

3) The position accuracy of the bore of the ferrule with respect to the guide hole of the ferrule.

For the single-mode ferrule, the position accuracy of the bore of the ferrule with respect to the guide hole of the ferrule is generally required to reach about 0.003 mm, or even required to reach about 0.0018 mm for a low insertion loss single-mode ferrule.

For the multi-mode ferrule, the position accuracy of the bore of the ferrule with respect to the guide hole of the ferrule is generally required to reach about 0.006 mm.

As those skilled in this art all known, the cost of the high precision single-mode ferrule is much higher than that of the low precision multi-mode ferrule, therefore, using the high precision single-mode ferrule to manufacture the high precision single-mode fiber optic connector has a disadvantage of increasing the cost of the single-mode fiber optic connector, and the cost of the single-mode fiber optic connector with the ultralow insertion loss may be times than that of the multi-mode fiber optic connector manufactured by the multi-mode ferrule.

As described above, in the prior art, the high precision single-mode fiber optic connector only can be manufactured by using the high precision single-mode ferrule, and it is impossible to use the low precision multi-mode ferrule to manufacture the high precision single-mode fiber optic connector, therefore, the cost of the high precision single-mode fiber optic connector manufactured in the prior art is very high. Furthermore, in order to avoid the deviation between the bore of the ferrule and the fiber inserted the bore of the ferrule, the diameter of the bore of the high precision single-mode ferrule is formed very small and almost equal to that of the fiber, therefore, it is difficult to insert the fiber into the bore, and the fiber is easily broken during inserting the fiber, decreasing the insertion efficiency of the fiber.

In order to overcome the above problems in the prior art, the applicant of the present invention once proposed a solution in which the high precision single-mode fiber optic connector can be manufactured by using the low precision multi-mode ferrule (with a large bore diameter and a large eccentric), instead of using the expensive high precision single-mode ferrule. The solution simplifying the production, decreases the cost, and improving the optical performance (for example, decreasing the low insertion loss) of the high precision single-mode fiber optic connector.

In the solution provided by the applicant before, the single-mode fiber protruding from the ferrule is introduced into a high precision indexing tool, so that a center of a coating layer on the single-mode fiber is aligned with a center of a high precision alignment bore in the indexing tool. After being aligned, the single-mode fiber is fixed in the bore of the low precision multi-mode ferrule. In this way, a high precision single-mode optic ferrule assembly or connector can be manufactured by using the low precision multi-mode ferrule.

However, this solution is achieved by aligning the center of the coating layer on the fiber, instead of aligning a center of a fiber core of the fiber. Thereby, in this solution, there is a prerequisite that the coating layer and the fiber core of the fiber must have good concentricity. Unfortunately, an eccentric error is unavoidable between the coating layer and the fiber core of the fiber during manufacturing the fiber. The eccentric error is random and cannot be controlled in the practice. For example, different batches of fibers may have different eccentric errors, even the same batch of fibers may have different eccentric errors, and the fibers from different manufactures may have different eccentric errors. Furthermore, there may be contaminants, for example, particles/dusts, attached on the surface of the coating layer of the fiber. As a result, in this solution provided by the applicant before, it cannot ensure that the center of the fiber core of the fiber is aligned in the highest precision. Concerning this, the present invention is proposed.

SUMMARY OF THE INVENTION

The present invention has been made to overcome or alleviate at least one aspect of the above mentioned disadvantages.

According to an object of the present invention, there is provided an alignment system and a method for calibrating a position of an optical fiber in a bore of a ferrule, wherein a center of a fiber core of the optical fiber is positioned at a theoretical center relative to a positioning reference defined by a center of a guide hole of the ferrule, reducing a radial deviation between the center of the fiber core of the optical fiber and the theoretical center of the optical fiber, and decreasing the insertion loss of the ferrule.

According to an aspect of the present invention, there is provided an alignment system for calibrating a position of an optical fiber in a bore of a ferrule, comprising: a calibration ferrule having an alignment guide hole formed therein; an alignment guide element for calibrating a center position of a guide hole of the ferrule, so that a center of the guide hole of the ferrule is aligned with a center of the alignment guide hole; a fiber core alignment element comprising a fiber core having a center positioned at a theoretical center relative to a positioning reference defined by the center of the alignment guide hole; an optical vision system for identifying a center position of a fiber core of the optical fiber and the center position of the fiber core of the respective fiber core alignment element; and a controlling and moving system for actively adjusting the position of the optical fiber in the bore of the ferrule under the guide of the optical vision system, so that the center of the fiber core of the optical fiber is aligned with the center of the fiber core of the respective fiber core alignment element, and so that the center of the fiber core of the optical fiber is positioned at a theoretical center relative to a positioning reference defined by the center of the guide hole of the ferrule.

According to an exemplary embodiment of the present invention, the ferrule comprises a plurality of bores each for receiving the respective optical fiber therein; and wherein the alignment system comprises a plurality of fiber core alignment elements corresponding to the optical fibers in the plurality of bores one by one, so as to calibrate the positions of the optical fibers in the bores, respectively.

According to another exemplary embodiment of the present invention, the plurality of fiber core alignment elements are arranged in one or more rows; and wherein centers of the fiber core alignment elements in each row of fiber core alignment elements are equally spaced from one another.

According to another exemplary embodiment of the present invention, the alignment guide element is fixed in the alignment guide hole of the calibration ferrule or integrally formed on the calibration ferrule.

According to another exemplary embodiment of the present invention, the fiber core alignment element is fixed in a bore of the calibration ferrule or integrally formed on the calibration ferrule.

According to another exemplary embodiment of the present invention, the alignment guide element is configured to be a positioning rod; and two ends of the positioning rod are inserted into the alignment guide hole of the calibration ferrule and the guide hole of the ferrule, respectively.

According to another exemplary embodiment of the present invention, the optical vision system at least comprises: a first imaging device configured to capture a first image of the optical fiber and the fiber core alignment element in a first direction perpendicular to an axis of the alignment guide element; a second imaging device configured to capture a second image of the optical fiber and the fiber core alignment element in a second direction perpendicular to the axis of the alignment guide element and the first direction; and an image recognition device configured to recognize the center position of the fiber core of the optical fiber and the center position of the fiber core of the fiber core alignment element in the first image and recognize the center position of the fiber core of the optical fiber and the center position of the fiber core of the fiber core alignment element in the second image.

According to another exemplary embodiment of the present invention, the first imaging device comprises: a first light source provided at one side of the alignment guide element in the first direction; and a first camera, opposite to the first light source, provided at the other side of the alignment guide element in the first direction.

According to another exemplary embodiment of the present invention, the second imaging device comprises: a second light source provided at one side of the alignment guide element in the second direction; and a second camera, opposite to the second light source, provided at the other side of the alignment guide element in the second direction.

According to another exemplary embodiment of the present invention, the image recognition device comprises an image processing system for processing the first image and the second image.

According to another exemplary embodiment of the present invention, an end of the optical fiber protrudes from an end surface of the ferrule, wherein an end of the fiber core alignment element protrudes from an end surface of the calibration ferrule, and wherein the end of the fiber core alignment element faces and is spaced from the end of the optical fiber.

According to another exemplary embodiment of the present invention, the first imaging device and the second imaging device are configured to capture images of the ends, facing to and spaced from each other, of the optical fiber and the fiber core alignment element.

According to another exemplary embodiment of the present invention, the controlling and moving system comprises: a manipulator having a gripper for gripping the optical fiber; and a closed loop feedback control system configured to adjust a position of the gripper until an error, detected by the optical vision system, between the center position of the fiber core of the optical fiber and the center position of the fiber core of the fiber core alignment element is equal to zero or within a predetermined range.

According to another exemplary embodiment of the present invention, the predetermined range is a range of –0.001 mm~0.001 mm.

According to another exemplary embodiment of the present invention, the predetermined range is a range of –0.3 µm~0.3 µm.

According to another aspect of the present invention, there is provided a method of calibrating a position of an optical fiber in a bore of a ferrule, comprising steps of:

providing a calibration ferrule with an alignment guide hole, an alignment guide element and a fiber core alignment element, wherein a center of a fiber core of the fiber core alignment element is positioned at a theoretical center relative to a positioning reference defined by a center of the alignment guide hole;

calibrating a center position of a guide hole of the ferrule with the alignment guide element, so that the center of the guide hole of the ferrule is aligned with the center of the alignment guide hole; and actively adjusting the position of the optical fiber in the bore of the ferrule under the guide of an optical vision system, so that a center of a fiber core of the optical fiber is aligned with the center of the fiber core of the respective fiber core alignment element. According to an exemplary embodiment of the present invention, the position of the optical fiber in the bore of the ferrule is adjusted by a controlling and moving system; and the controlling and moving system comprises: a manipulator having a gripper for gripping the optical fiber; and a closed loop feedback control system configured to adjust a position of the gripper until an error, detected by the optical vision system, between the center position of the fiber core of the optical fiber and the center position of the fiber core of the fiber core alignment element is equal to zero or within a predetermined range.

According to another exemplary embodiment of the present invention, the error comprises: a first error, detected by the optical vision system, between the center position of the fiber core of the optical fiber and the center position of the fiber core of the fiber core alignment element in the first image; and a second error, detected by the optical vision system, between the center position of the fiber core of the optical fiber and the center position of the fiber core of the fiber core alignment element in the second image.

According to another aspect of the present invention, there is provided an alignment system for calibrating a position of an optical fiber in a bore of a ferrule, comprising: a fiber core alignment element comprising a fiber core having a center positioned at a theoretical center relative to a positioning reference of the ferrule; an optical vision system for identifying a center position of a fiber core of the optical fiber and the center position of the fiber core of the respective fiber core alignment element; and a controlling and moving system for actively adjusting the position of the optical fiber in the bore of the ferrule under the guide of the optical vision system, so that the center of the fiber core of the optical fiber is aligned with the center of the fiber core of the respective fiber core alignment element.

According to another aspect of the present invention, there is provided a method of calibrating a position of an optical fiber in a bore of a ferrule, comprising steps of:

providing a fiber core alignment element comprising a fiber core having a center positioned at a theoretical center relative to a positioning reference of the ferrule; and actively adjusting the position of the optical fiber in the bore of the ferrule under the guide of an optical vision system, so that a center of a fiber core of the optical fiber is aligned with the center of the fiber core of the respective fiber core alignment element.

According to another aspect of the present invention, there is provided an alignment system for calibrating a position of an optical fiber in a bore of a ferrule, comprising: a calibration ferrule having an alignment guide hole formed therein; a fiber core alignment element comprising a fiber core having a center positioned at a theoretical center relative to a positioning reference defined by the center of the alignment guide hole; an optical vision system for identifying a center position of the alignment guide hole in the calibration ferrule and a center position of a guide hole in the ferrule, and identifying a center position of a fiber core of the optical fiber and the center position of the fiber core of the respective fiber core alignment element; and a controlling and moving system for actively adjusting the center position of the guide hole in the ferrule under the guide of the optical vision system, so that the center of the guide hole in the ferrule is aligned with the center of the alignment guide hole in the calibration ferrule, and actively adjusting the position of the optical fiber in the bore of the ferrule under the guide of the optical vision system, so that the center of the fiber core of the optical fiber is aligned with the center of the fiber core of the respective fiber core alignment element, and so that the center of the fiber core of the optical fiber is positioned at a theoretical center relative to a positioning reference defined by the center of the guide hole of the ferrule.

According to another aspect of the present invention, there is provided a method of calibrating a position of an optical fiber in a bore of a ferrule, comprising steps of:

providing a fiber core alignment element and a calibration ferrule with an alignment guide hole, wherein the fiber core alignment element comprising a fiber core having a center positioned a theoretical center relative to a positioning reference defined by the center of the alignment guide hole; and actively adjusting a center position of a guide hole in the ferrule under the guide of the optical vision system, so that the center of the guide hole in the ferrule is aligned with the center of the alignment guide hole in the calibration ferrule; and actively adjusting the position of the optical fiber in the bore of the ferrule under the guide of the optical vision system, so that a center of a fiber core of the optical fiber is aligned with the center of the fiber core of the respective fiber core alignment element.

According to another aspect of the present invention, there is provided a method of manufacturing a fiber optic ferrule assembly comprising a ferrule and an optical fiber in a bore of the ferrule, the method comprising steps of:

calibrating a position of the optical fiber in the bore of the ferrule by means of the above alignment system or the above method, so that a center of a fiber core of the optical fiber is aligned with a theoretical center relative to a positioning reference defined by a center of a guide hole in the ferrule; and fixing the optical fiber in the bore of the ferrule with a curable adhesive.

According to another aspect of the present invention, there is provided a fiber optic ferrule assembly comprising a ferrule and an optical fiber in a bore of the ferrule, wherein the fiber optic ferrule assembly is manufactured by the preceding method.

According to another aspect of the present invention, there is provided a fiber optic connector, comprising: a housing; and the above fiber optic ferrule assembly mounted in the housing.

In the embodiments of the present invention, the position of the optical fiber in the bore of the ferrule is actively adjusted, under the guide of the optical vision system, by means of a controlling and moving system. As a result, the center of the fiber core of the optical fiber is aligned with the center of the fiber core of the respective fiber core alignment element, and the center of the fiber core of the optical fiber is positioned at the theoretical center relative to the positioning reference defined by the center of the guide hole of the ferrule.

Thereby, a high precision fiber optic ferrule assembly and connector can be manufactured by a low precision fiber optic ferrule (with larger bore and eccentricity that standard fiber optic ferrule). In this way, the embodiments of the present invention simplifies the production, reduces the cost, and decreasing the low insertion loss of the fiber optic connector. The embodiments of the present invention even can achieve a fiber optic connector without any insertion loss.

In the solution, in which the center of the coating layer on the fiber is aligned by the high precision indexing tool, provided by the applicant before, there is a prerequisite that the coating layer and the fiber core of the fiber must have good concentricity. Unfortunately, an eccentric error is unavoidable between the coating layer and the fiber core of the fiber during manufacturing the fiber. The eccentric error is random and cannot be controlled in the practice. For example, different batches of fibers may have different eccentric errors, even the same batch of fibers may have different eccentric errors, and the fibers from different manufactures may have different eccentric errors. Furthermore, there may be contaminants, for example, particles/dusts, attached on the surface of the coating layer of the fiber. As a result, in this solution provided by the applicant before, it cannot ensure that the center of the fiber core of the fiber is aligned in the highest precision.

The embodiments of the present invention is different from the solution in prior art. In the embodiments of the present invention, the center of the fiber core of the fiber is recognized with the optical vision system, and then the controlling and moving system actively adjusts the center position of the fiber core of the fiber until the center of the fiber core of the fiber is aligned with the center of the fiber core of the fiber core alignment element fixed in the high precision single-mode ferrule. The fiber core alignment element protrudes from the high precision single-mode ferrule by a predetermined length, and the eccentric error between the center of the fiber core of the fiber core alignment element and the theoretical center relative to the positioning reference defined by the center of the alignment guide hole can be controlled within nanometers, or even to be equal to zero. In this way, by image recognizing the center of the fiber core of the fiber, instead of the center of the coating layer on the fiber, the embodiments of the present invention can eliminating the random eccentric error of the coating layer and the fiber core, the random diameter error of the coating layer, and other errors due to various conditions, for example, a bad end state of the ferrule, or contaminants attached on the coating layer. In the embodiments of the present invention, the alignment precision may reach the order of nanometers. After being aligned, the fiber is fixed in the low precision ferrule. Then, the ferrule is taken down from the alignment system, and the end surface of the ferrule is processed. Thereafter, the ferrule is assembled into the housing of the connector, and the performance of which is tested. In this way, by actively adjusting the position of the fiber, the fiber is aligned in the high precision, and the high precision fiber optic connector with low cost and ultra-low insertion loss can be obtained.

As for the multi-fiber optic connector, the alignment system comprises the high precision alignment guide element, the high precision calibration ferrule, the high precision fiber core alignment element fixed in the calibration ferrule, and the optical vision system. The fiber core alignment element protrudes from the calibration ferrule by a predetermined length. The eccentric error between the center of the fiber core of the fiber core alignment element and the theoretical center relative to the positioning reference defined by the center of the alignment guide hole is controlled within nanometers, or even equal to zero. With the alignment guide element, the guide hole of the low precision ferrule is aligned with the alignment guide hole of the high precision calibration ferrule. The alignment reference is defined by the center of the guide hole or the alignment guide hole. The position of the fiber in the low precision ferrule is actively adjusted, so that the center of the fiber core of the fiber is aligned with the center of the fiber core of the fiber core alignment element. In this way, the eccentric error between the fiber core of the fiber and the fiber core of the fiber core alignment element in a plane perpendicular to an axis of the fiber core alignment element may be adjusted to be within the order of nanometers.

In the embodiments of the present invention, the position precision of the fiber in the bore of the ferrule may be controlled, predicted, and repeated. It may reduce or even eliminate various disadvantageous effects due to the random error of the diameter of the coating layer, the random error of different batches of fibers, the random eccentric error between the coating layer and the fiber core. Thereby, the embodiments of the present invention improve the optical performance and the random matching performance of the fiber optic connectors, that is, the coupled fiber optic connectors have ultra-low insertion loss and ultra-low matching insertion loss.

In the present invention, by actively calibrating the fiber core of the fiber, a single-mode fiber optic connector with low cost, high precision and low insertion loss may be manufactured by the low precision ferrule.

Although the present invention is discussed herein by using the low precision ferrule to manufacture the single-mode fiber optic connector with ultra-low insertion loss, the present invention is also adapted to manufacture a multi-mode fiber optic connector by using the low precision ferrule, and this case is also in the protection scope of the present invention.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF PREFERRED EMBODIMENTS OF THE IVENTION

Figure 1:
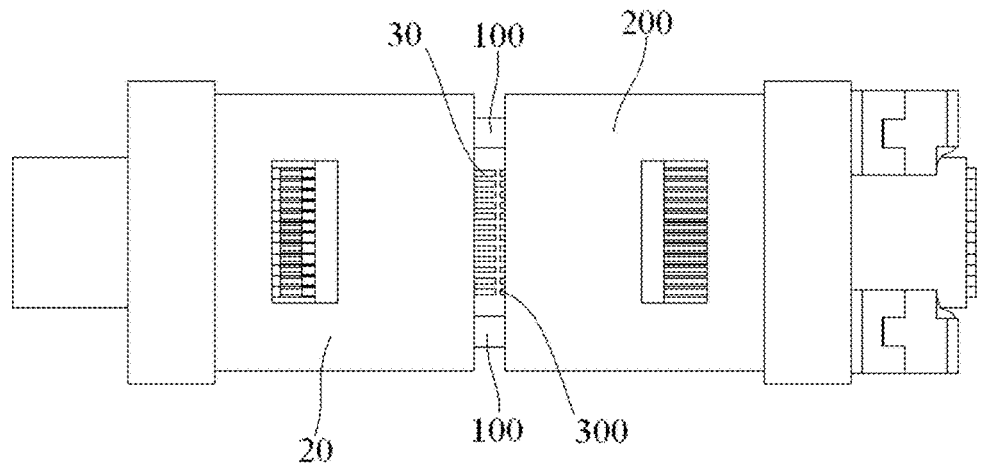
FIG. 1 is an illustrative view of a high precision alignment guide element and a high precision fiber core alignment element of an alignment system according to an exemplary embodiment of the present invention.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

According to a general concept of the present invention, there is provided an alignment system for calibrating a position of an optical fiber in a bore of a ferrule, comprising: a calibration ferrule having an alignment guide hole formed therein; an alignment guide element for calibrating a center position of a guide hole of the ferrule, so that a center of the guide hole of the ferrule is aligned with a center of the alignment guide hole; a fiber core alignment element comprising a fiber core having a center positioned at a theoretical center relative to a positioning reference defined by the center of the alignment guide hole; an optical vision system configured to identify a center position of a fiber core of the optical fiber and the center position of the fiber core of the respective fiber core alignment element; and a controlling and moving system for actively adjusting the position of the optical fiber in the bore of the ferrule under the guide of the optical vision system, so that the center of the fiber core of the optical fiber is aligned with the center of the fiber core of the respective fiber core alignment element, and so that the center of the fiber core of the optical fiber is positioned at a theoretical center relative to a positioning reference defined by the center of the guide hole of the ferrule.

In an exemplary embodiment of the present invention, there is disclosed an alignment system for calibrating a position of an optical fiber 30 in a bore 31 of a ferrule 20. As shown in FIGS. 1-8, the alignment system mainly comprises: a high precision calibration ferrule 200 with a high precision alignment guide hole 201; a high precision alignment guide element 100 for aligning a center of a guide hole 21 of the ferrule 20 to a center of the high precision alignment guide hole 201; a high precision fiber core alignment element 300 comprising a fiber core 302 having a center positioned at a theoretical center relative to a positioning reference defined by the center of the alignment guide hole 201; an optical vision system for identifying a center position of a fiber core 32 of the optical fiber 30 and the center position of the fiber core 302 of the respective fiber core alignment element 300; and a controlling and moving system for actively adjusting the position of the optical fiber 30 in the bore 31 of the ferrule 20 under the guide of the optical vision system, so that the center of the fiber core 32 of the optical fiber 30 is aligned with the center of the fiber core 302 of the respective fiber core alignment element 300, and so that the center of the fiber core 32 of the optical fiber 30 is positioned at a theoretical center relative to a positioning reference defined by the center of the guide hole 21 of the ferrule 20.

Please be noted that the term "high precision" herein means a precision higher or equal to a precision required in an industry standard of fiber optic connector. However, since the precision required in the industry standard of fiber optic connector may be changed with the times, the high precision herein is not limited to a specific value or a specific value range, and may be changed with the times.

Figure 3:
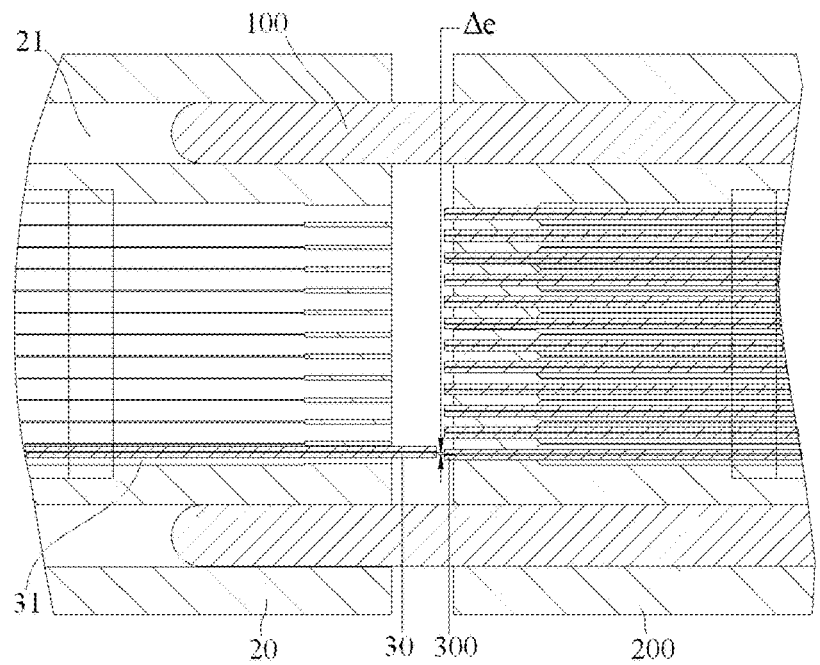
FIG. 3 is a horizontal longitudinal cross section view of a ferrule (to be manufactured) with an optical fiber after the alignment guide element is inserted into a guide hole of the ferrule.

FIG. 1 is an illustrative view of a high precision alignment guide element 100 and a high precision fiber core alignment element 300 of an alignment system according to an exemplary embodiment of the present invention; FIG. 3 is a horizontal longitudinal cross section view of a ferrule 20 (to be manufactured) with an optical fiber 30 after the alignment guide element 100 is inserted into a guide hole 21 of the ferrule 20.

As shown in FIGS. 1 and 3, the ferrule 20 is a multi-fiber ferrule. The ferrule 20 comprises a plurality of bores 31 each for receiving the respective optical fiber 30 therein. The alignment system comprises a plurality of fiber core alignment elements 300 corresponding to the optical fibers 30 in the plurality of bores 31 one by one, so as to calibrate the positions of the optical fibers 30 in the bores 31, respectively.

In an exemplary embodiment, as shown in FIG. 3, the diameter of the bore 31 of the ferrule 20 is much larger than the diameter of the fiber 30, so that the fiber 30 can be easily inserted into the bore 31 of the ferrule 20. In this way, it can reduce the cost of the ferrule 20, because it does not need to provide a high precision ferrule with a high precision bore accurately matched with the fiber 30. However, since the diameter of the bore 31 of the ferrule 20 is much larger than the diameter of the fiber 30, it is difficult to ensure the position precision of the fiber 30 in the bore 31 of the ferrule 20, that is, it is difficult to position the center of the fiber core 32 (see FIG. 6) of the fiber 30 at a theoretical center relative to the positioning reference defined by the center of the guide hole 21 of the ferrule 20.

Figures 2A, 2B:
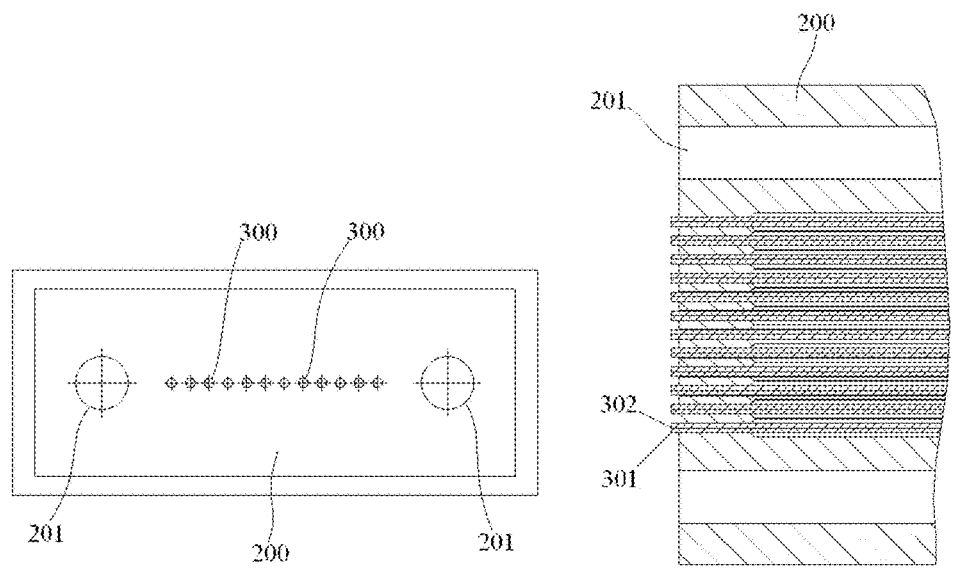
FIGS. 2A and 2B show an enlarged lateral cross section view and an enlarged longitudinal cross section view of the high precision fiber core alignment element of FIG. 1 and a high precision calibration ferrule for fixing the high precision fiber core alignment, respectively.

FIGS. 2A and 2B show an enlarged lateral cross section view and an enlarged longitudinal cross section view of the high precision fiber core alignment element 300 of FIG. 1 and a high precision calibration ferrule 200 for fixing the high precision fiber core alignment 300, respectively.

In an exemplary embodiment, as shown in FIGS. 1-3, the high precision 100 is fixed in the high precision alignment guide hole 201 of the high precision calibration ferrule 200. The high precision fiber core alignment element 300 is fixed in the bore of the high precision calibration ferrule 200. As shown in FIG. 2B, the high precision fiber core alignment element 300 comprises a fiber core 302 and a coating layer 301 covered on the fiber core 302. In an embodiment, a center of the fiber core 302 of each of the high precision fiber core alignment elements 300 is positioned at a respective theoretical center relative to the positioning reference defined by the center of the alignment guide hole 201.

As shown in FIGS. 1-3, the high precision fiber core alignment elements 300 each is fixed the respective bore of the high precision calibration ferrule 200. But the present invention is not limited to the illustrated embodiments, the high precision fiber core alignment elements 300 may be integrally formed on the high precision calibration ferrule 200.

Referring to FIGS. 1-3 again, in an embodiment, the plurality of fiber core alignment elements 300 are arranged in a row, and centers of the fiber core alignment elements 300 in the row of fiber core alignment elements 300 are equally spaced from one another. But the present invention is not limited to the illustrated embodiments, the plurality of fiber core alignment elements 300 may be arranged in two or more rows; and centers of the fiber core alignment elements 300 in each row of fiber core alignment elements 300 are equally spaced from one another.

As shown in FIGS. 1-3, in an embodiment, the high precision alignment guide element 100 is configured to be a high precision positioning rod; and two ends of the high precision positioning rod are inserted into the high precision alignment guide hole 201 of the high precision calibration ferrule 200 and the guide hole 21 of the ferrule 20, respectively. In this way, the center of the guide hole 21 in the ferrule 20 is aligned with the center of the high precision alignment guide hole 201 in the high precision calibration ferrule 200 by means of the high precision alignment guide element 100, for example, an error between the center of the guide hole 21 and the center of the high precision alignment guide hole 201 is controlled within a range of −0.001 mm~0.001 mm, preferably, within a range of −0.3 μm~0.3 μm.

As shown in FIGS. 1-3, the center of the fiber core 302 of the high precision fiber core alignment element 300 is positioned at the theoretical center with respect to the positioning reference defined by the center of the high precision alignment guide hole 201.

As described above, since the diameter of the bore 31 in the ferrule 20 is much larger than the diameter of the optical fiber 30, it is difficult to ensure that the center of the fiber core 32 of the fiber 30 is positioned at the theoretical center with respect to the positioning reference defined by the center of the guide hole 21 of the ferrule 20 after the optical fiber 30 is inserted into the bore 31 of the ferrule 20. That is, it is difficult to ensure that the center of the fiber core 32 of the optical fiber 30 is aligned with the center of the fiber core 302 of the high precision fiber core alignment element 300. For example, as shown in FIG. 3, there is an error Δe between the center of the fiber core 32 of the optical fiber 30 and the center of the fiber core 302 of the high precision fiber core alignment element 300.

Figure 4:
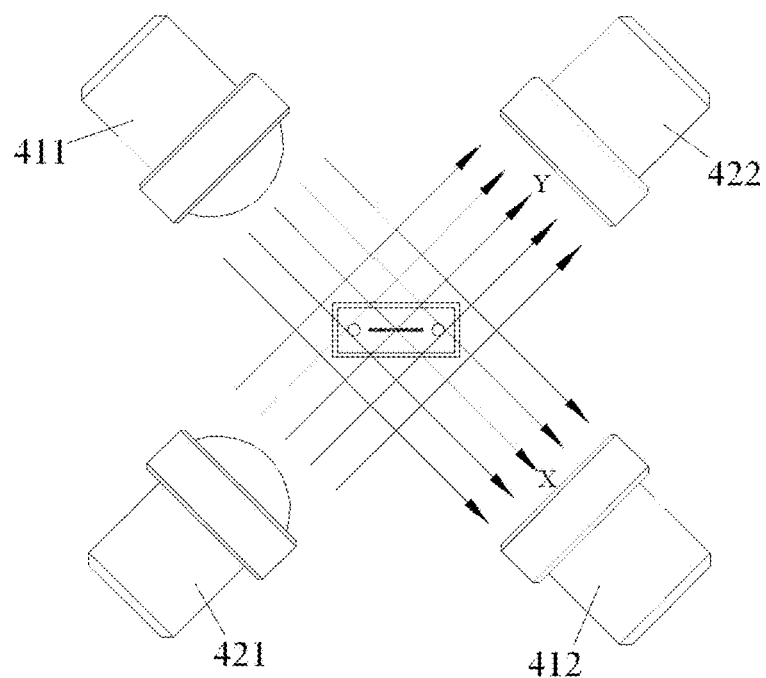
FIG. 4 is an illustrative view of an optical vision system of an alignment system according to an exemplary embodiment of the present invention.
Figure 5A:
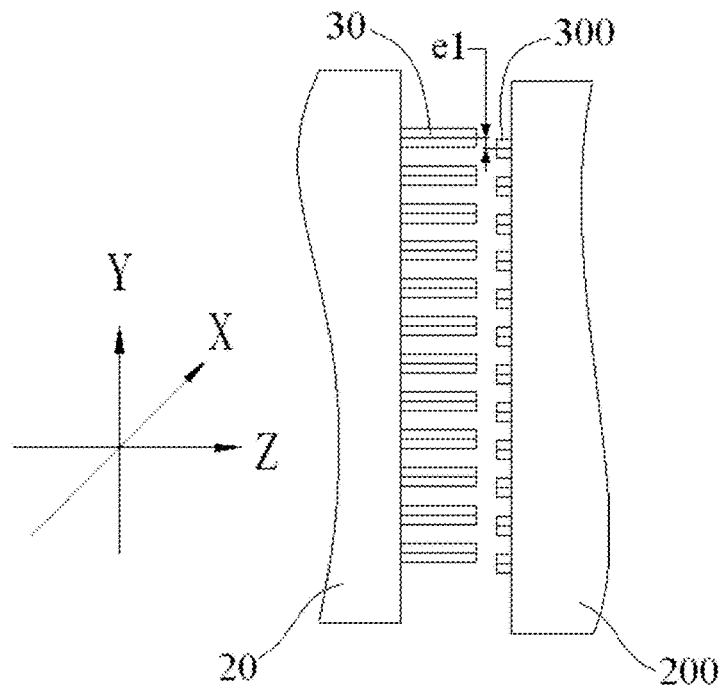
FIG. 5A is an illustrative view of picking up a first image of the fiber and the fiber core alignment element in a first direction by means of the optical vision system of FIG. 4.
Figure 5B:
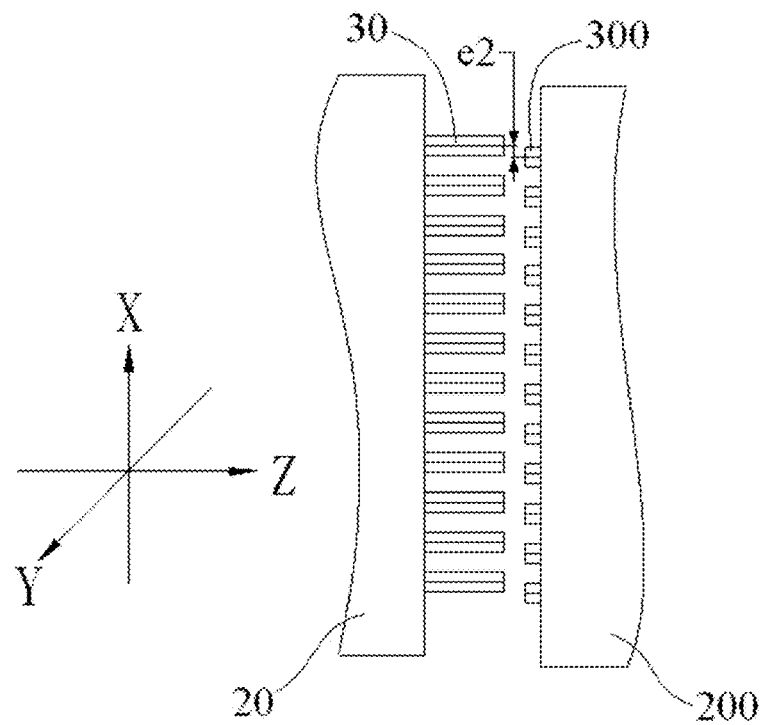
FIG. 5B is an illustrative view of picking up a second image of the fiber and the fiber core alignment element in a second direction by means of the optical vision system of FIG. 4.

FIG. 4 is an illustrative view of an optical vision system of an alignment system according to an exemplary embodiment of the present invention; FIG. 5A is an illustrative view of picking up a first image of the fiber and the fiber core alignment element in a first direction X (an angle of the first direction X with respect to a horizontal longitudinal plane is about 45 degrees) by means of the optical vision system of FIG. 4; FIG. 5B is an illustrative view of picking up a second image of the fiber and the fiber core alignment element in a second direction Y (an angle of the second direction Y with respect to the horizontal longitudinal plane is about 135 degrees) by means of the optical vision system of FIG. 4.

As shown in FIG. 5A, in a longitudinal cross section view of the ferrule 20 and the calibration ferrule 200 taken in the first direction X perpendicular to a center axis of the high precision alignment guide element 100, there is a first error e1 between the center of the fiber core 32 of the optical fiber 30 and the center of the fiber core 302 of the high precision fiber core alignment element 300.

As shown in FIG. 5B, in the longitudinal cross section view of the ferrule 20 and the calibration ferrule 200 taken in the second direction Y perpendicular to the center axis of the high precision alignment guide element 100, there is a second error e2 between the center of the fiber core 32 of the optical fiber 30 and the center of the fiber core 302 of the high precision fiber core alignment element 300.

Therefore, in order to align the center of the fiber core 32 of the optical fiber 30 to the center of the fiber core 302 of the high precision fiber core alignment element 300, in an embodiment of the present invention, the controlling and moving system actively adjusts the position of the optical fiber 30 in the bore 31 of the ferrule 20 under the guide of the optical vision system until the first error e1 and the second error e2 are adjusted to be equal to zero or within a predetermined range. In an example, the predetermined range may be a range of −0.001 mm~0.001 mm, preferably, a range of −0.3 μm~0.3 μm. In this way, the center of the fiber core 32 of the optical fiber 30 is aligned with the center of the fiber core 302 of the high precision fiber core alignment element 300, so that the center of the fiber core 32 of the optical fiber 30 is positioned at the theoretical center with respect to the positioning reference defined by the center of the guide hole 21 of the ferrule 20.

FIG. 5A and FIG. 5B show the first error e1 and the second error e2 between the center of the fiber core 32 of the optical fiber 30 and the center of the fiber core 302 of the high precision fiber core alignment element 300 in two two-dimensional planes perpendicular to each other and parallel to the center axis of the center axis of the high precision alignment guide element 100, respectively. That is, an error e between the center of the fiber core 32 of the optical fiber 30 and the center of the fiber core 302 of the high precision fiber core alignment element 300 in three-dimensional space can be calculated according to the following expression (1).

$$e=\sqrt{e_1^2+e_2^2} \tag{1}$$

Therefore, in order to align the center of the fiber core 32 of the optical fiber 30 to the center of the fiber core 302 of the high precision fiber core alignment element 300, in another embodiment of the present invention, the controlling and moving system actively adjusts the position of the optical fiber 30 in the bore 31 of the ferrule 20 under the guide of the optical vision system until the error e is adjusted to be equal to zero or within a predetermined range. In an example, the predetermined range may be a range of −0.001 mm~0. 001 mm, preferably, a range of −0.3 μm~0.3 μm.

Hereafter, it will describe the process to actively adjust the position of the optical fiber 30 in the bore 31 of the ferrule 20 according to an exemplary embodiment with reference to FIGS. 4-8.

As shown in FIG. 4, the optical vision system at least comprises: a first imaging device 411, 412 configured to capture a first image of the optical fiber 30 and the high precision fiber core alignment element 300 in the first direction X perpendicular to the center axis of the high precision alignment guide element 100; a second imaging device 421, 422 configured to capture a second image of the optical fiber 30 and the high precision fiber core alignment element 300 in the second direction Y perpendicular to the center axis of the high precision alignment guide element 100 and the first direction X; and an image recognition device (not shown, for example, a computer) configured to recognize the center position of the fiber core 32 of the optical fiber 30 and the center position of the fiber core 302 of the fiber core alignment element 300 in the first image and recognize the center position of the fiber core 32 of the optical fiber 30 and the center position of the fiber core 302 of the fiber core alignment element 300 in the second image.

In an exemplary embodiment of the present invention, as shown in FIG. 4, the first imaging device 411, 412 comprises: a first light source 411 provided at one side of the alignment guide element 100 in the first direction X; and a first camera 412 provided at the other side, opposite to the first light source 411, of the alignment guide element 100 in the first direction X. The second imaging device 421, 422 comprises: a second light source 421 provided at one side of the alignment guide element 100 in the second direction Y; and a second camera 422 provided at the other side, opposite to the second light source 421, of the alignment guide element 100 in the second direction Y.

Please be noted that the present invention is not limited to the illustrated embodiments, the optical vision system may further comprise a third imaging device similar to the first and second imaging devices. That is, the optical vision system may comprise three, four or more imaging devices similar to the first and second imaging devices.

Figure 6:
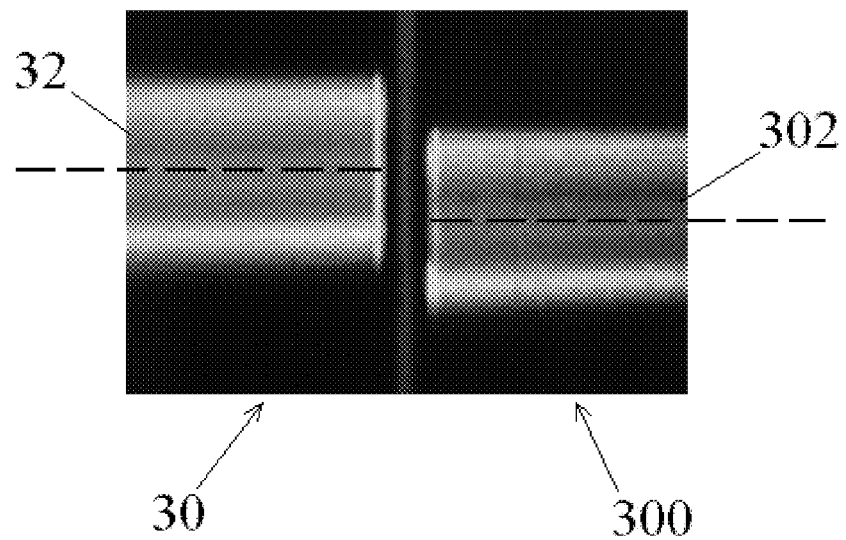
FIG. 6 shows the first image of the fiber and the fiber core alignment element captured by the optical vision system of FIG. 4 in the first direction.

As shown in FIG. 5A, an end of the optical fiber 30 protrudes from an end surface of the ferrule 20, and an end of the fiber core alignment element 300 protrudes from an end surface of the calibration ferrule 200. The end of the fiber core alignment element 300 faces and is spaced from the end of the optical fiber 30. FIG. 6 shows the first image of the ends of the fiber and the fiber core alignment element captured by the first imaging device 411, 412 in the first direction X.

As shown in FIG. 6, in the first image, the center (indicated by dash line in FIG. 6) of the fiber core (a brightening part) 32 of the optical fiber 30 offsets from the center (indicated by dash line in FIG. 6) of the fiber core (a brightening part) 302 of the high precision fiber core alignment element 300, that is, there is an error e1 between the center of the fiber core 32 of the optical fiber 30 and the center of the fiber core 302 of the high precision fiber core alignment element 300. Please be noted that the fiber core is made of a material different from the coating layer on the fiber, thereby, the fiber core and the coating layer can be clearly distinguished from each other in the first image. If required, the image recognition device may comprise an image processing system for processing the first image, so that the border of the fiber bore is more clearly distinguished from the border of the coating layer. In this way, it can easily recognize the center of the fiber core of the optical fiber 30 and the center of the fiber core of the high precision fiber core alignment element 300.

After recognizing the center of the fiber core of the optical fiber 30 and the center of the fiber core of the high precision fiber core alignment element 300, the controlling and moving system can actively adjust the position of the optical fiber 30 in the bore of the ferrule 20 under the guide of the optical vision system until the first error e1 and the second error e2, detected in the first image and the second image, between the center of the fiber core of the optical fiber 30 and the center of the fiber core of the high precision fiber core alignment element 300 are adjusted to be equal to zero or within the predetermined range.

Figure 7:
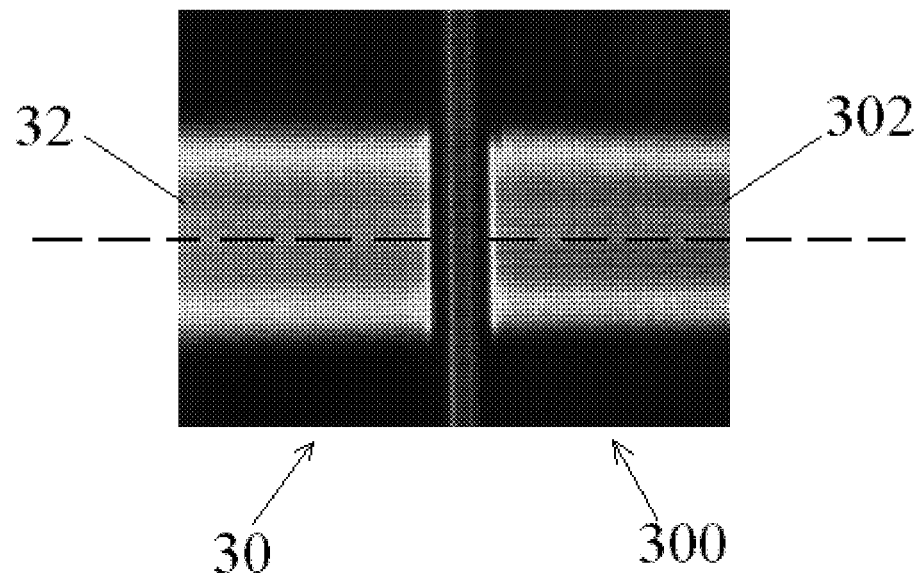
FIG. 7 shows an image of the fiber and the fiber core alignment element after a center of a fiber core of the fiber is actively adjusted to align with a center of a fiber core of the fiber core alignment element.

For example, FIG. 7 shows an image of the fiber 30 and the fiber core alignment element 300 after the center (indicated by dash line in FIG. 7) of the fiber core 32 of the fiber 30 is actively adjusted to align with the center (indicated by dash line in FIG. 7) of the fiber core 302 of the fiber core alignment element 300.

In order to move the optical fiber 30 in high precision, in an exemplary embodiment, the controlling and moving system may comprise a manipulator (not shown, for example a multi-freedom robot) and a closed loop feedback control system. In an embodiment, the manipulator has a gripper for gripping the optical fiber 30. The closed loop feedback control system is configured to adjust the position of the gripper until the error, detected by the optical vision system, between the center position of the fiber core 32 of the optical fiber 30 and the center position of the fiber core 302 of the fiber core alignment element 300 is equal to zero or within the predetermined range.

Figure 8:
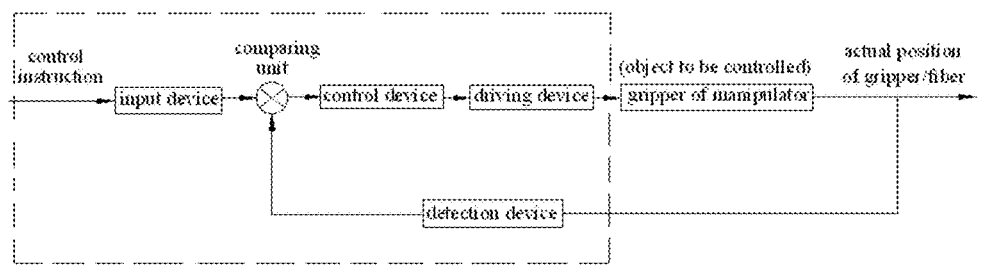
FIG. 8 is an illustrative view of a closed loop feedback control system for controlling a manipulator according to an exemplary embodiment of the present invention.

FIG. 8 is an illustrative view of the closed loop feedback control system for controlling the manipulator according to an exemplary embodiment of the present invention.

As shown in FIG. 8, the closed loop feedback control system may comprise an input device, a control device, a driving device and a detection device. The detection device, for example, the optical vision system, is configured to detect an actual position of the fiber/gripper. The control device is configured to control the driving device to run. The driving device is configured to drive the gripper (an object to be controlled) of the manipulator to move. A control instruction (a target position of the fiber/gripper) is input into the control system, and an error between the target position and the actual position of the fiber/gripper is obtained in a comparing unit. Since a position closed loop feedback control system is a typical control system, and its description is omitted herein.

In another exemplary embodiment of the present invention, the high precision alignment guide element 100 may be integrally formed on the high precision calibration ferrule 200. Similarly, the high precision fiber core alignment element 300 may be integrally formed on the high precision calibration ferrule 200.

In another exemplary embodiment of the present invention, the center of the guide hole 21 of the ferrule 20 and the center of the high precision alignment guide hole 201 of the high precision calibration ferrule 200 may be recognized by the optical vision system, and then the controlling and moving system actively aligns the center of the guide hole 21 and the center of the high precision alignment guide hole 201 under the guide of the optical vision system, instead of by using the above high precision alignment guide element 100 to align the center of the guide hole 21 with center of the high precision alignment guide hole 201. For example, the controlling and moving system may actively adjust the center position of the guide hole 21 and/or the center position of the high precision alignment guide hole 201 under the guide of the optical vision system, so that the center of the guide hole 21 is aligned with the center of the high precision alignment guide hole 201.

According to another exemplary embodiment of the present invention, there is also provided a method of calibrating a position of an optical fiber 30 in a bore 31 of a ferrule 20, comprising steps of:

providing a calibration ferrule 200 with an alignment guide hole 201, an alignment guide element 100 and a fiber core alignment element 300, wherein a center of a fiber core 302 of the fiber core alignment element 300 is positioned at a theoretical center relative to a positioning reference defined by a center of the alignment guide hole 201;

calibrating a center position of a guide hole 21 of the ferrule 20 with the alignment guide element 100, so that the center of the guide hole 21 of the ferrule 20 is aligned with the center of the alignment guide hole 201; and actively adjusting the position of the optical fiber 30 in the bore 31 of the ferrule 20 under the guide of an optical vision system, so that a center of a fiber core 32 of the optical fiber 30 is aligned with the center of the fiber core 302 of the respective fiber core alignment element 300.

According to another exemplary embodiment of the present invention, there is also provided a method of manufacturing a fiber optic ferrule assembly comprising a ferrule 20 and an optical fiber 30 in a bore of the ferrule 20, the method comprising steps of:

calibrating the position of the optical fiber 30 in the bore 31 of the ferrule 20 by means of the above alignment system or the above method, so that the center of the fiber core 32 of the optical fiber 30 is aligned with the theoretical center relative to the positioning reference defined by the center of the guide hole 201 in the ferrule 20; and fixing the optical fiber 30 in the bore of the ferrule 20 with a curable adhesive.

According to another exemplary embodiment of the present invention, there is also provided a fiber optic ferrule assembly comprising a ferrule 20 and an optical fiber 30 in a bore of the ferrule 20, wherein the fiber optic ferrule assembly is manufactured by the above method.

According to another exemplary embodiment of the present invention, there is also provided a fiber optic connector comprising: a housing; and the above fiber optic ferrule assemble mounted in the housing.

According to another exemplary embodiment of the present invention, there is also provided an alignment system for calibrating a position of an optical fiber 30 in a bore 31 of a ferrule 20, the alignment system comprising:

a fiber core alignment element 300 comprising a fiber core 302 having a center positioned at a theoretical center relative to a positioning reference of the ferrule 20;

an optical vision system for identifying a center position of a fiber core 32 of the optical fiber 30 and the center position of the fiber core 302 of the respective fiber core alignment element 300; and a controlling and moving system for actively adjusting the position of the optical fiber 30 in the bore 31 of the ferrule 20 under the guide of the optical vision system, so that the center of the fiber core 32 of the optical fiber 30 is aligned with the center of the fiber core 302 of the respective fiber core alignment element 300.

According to another exemplary embodiment of the present invention, there is also provided a method of calibrating a position of an optical fiber 30 in a bore 31 of a ferrule 20, comprising steps of:

providing a fiber core alignment element 300 comprising a fiber core 302 having a center positioned at a theoretical center relative to a positioning reference of the ferrule 20; and actively adjusting the position of the optical fiber 30 in the bore 31 of the ferrule 20 under the guide of an optical vision system, so that a center of a fiber core 32 of the optical fiber 30 is aligned with the center of the fiber core 302 of the respective fiber core alignment element 300.

According to another exemplary embodiment of the present invention, there is also provided an alignment system for calibrating a position of an optical fiber 30 in a bore 31 of a ferrule 20, the alignment system comprising:

a calibration ferrule 200 having an alignment guide hole 201 formed therein;

a fiber core alignment element 300 comprising a fiber core 302 having a center positioned at a theoretical center relative to a positioning reference defined by the center of the alignment guide hole 201;

an optical vision system for identifying a center position of the alignment guide hole 201 in the calibration ferrule 200 and a center position of a guide hole 21 in the ferrule 20, and identifying a center position of a fiber core 32 of the optical fiber 30 and the center position of the fiber core 302 of the respective fiber core alignment element 300; and a controlling and moving system for actively adjusting the center position of the guide hole 21 in the ferrule 20 under the guide of the optical vision system, so that the center of the guide hole 21 in the ferrule 20 is aligned with the center of the alignment guide hole 201 in the calibration ferrule 200, and actively adjusting the position of the optical fiber 30 in the bore 31 of the ferrule 20 under the guide of the optical vision system, so that the center of the fiber core 32 of the optical fiber 30 is aligned with the center of the fiber core 302 of the respective fiber core alignment element 300, and so that the center of the fiber core 32 of the optical fiber 30 is positioned at a theoretical center relative to a positioning reference defined by the center of the guide hole 21 of the ferrule 20.

According to another exemplary embodiment of the present invention, there is also provided a method of calibrating a position of an optical fiber 30 in a bore 31 of a ferrule 20, comprising steps of:

providing a fiber core alignment element 300 and a calibration ferrule 200 with an alignment guide hole 201, wherein the fiber core alignment element 300 comprises a fiber core 302 having a center positioned a theoretical center relative to a positioning reference defined by the center of the alignment guide hole 201; and actively adjusting a center position of a guide hole 21 in the ferrule 20 under the guide of the optical vision system, so that the center of the guide hole 21 in the ferrule 20 is aligned with the center of the alignment guide hole 201 in the calibration ferrule 200; and actively adjusting the position of the optical fiber 30 in the bore 31 of the ferrule 20 under the guide of the optical vision system, so that a center of a fiber core 32 of the optical fiber 30 is aligned with the center of the fiber core 302 of the respective fiber core alignment element 300.

In the prior art, the single-mode fiber optic connector must be manufactured by using the high precision ferrule, and the multi-mode fiber optic connector may be manufactured by using the low precision ferrule. Different from the prior art, in the embodiments of the present invention, the single-mode fiber optic connector is also manufactured by using the low precision ferrule, reducing the cost of the single-mode fiber optic connector.

In the present invention, since the position accuracy of the small diameter single-mode fiber in the large diameter bore of the low precision multi-mode ferrule can be calibrated by the alignment system to reach the position accuracy of the fiber in the bore of the high precision single-mode ferrule, a high precision single-mode optic connector can be manufactured by using the low precision multi-mode ferrule, instead of by using the expensive single-mode ferrule with high precision. Thereby, the present invention decreases the cost of the high precision single-mode multi-fiber optic connector.

Furthermore, as described above, since the diameter of the bore of the low precision multi-mode ferrule is much larger than the diameter of the single-mode fiber, the small diameter single-mode fiber can be easily and smoothly inserted into the large diameter bore of the low precision multi-mode ferrule, improving the insertion efficiency of the fiber.

In the present invention, the position precision of the fiber in the bore of the ferrule can be controlled, predicted, and repeated. It can reduce or even eliminate various disadvantageous effects due to the random error of the diameter of the coating layer on the fiber, the random error of different batches of fibers, the random eccentric error between the coating layer and the fiber core. Thereby, the present invention improves the optical performance and the random matching performance of the fiber optic connectors, that is, the coupled fiber optic connectors have ultra-low insertion loss and ultra-low matching insertion loss.

In the present invention, by actively calibrating the fiber core of the fiber, a single-mode fiber optic connector with low cost, high precision and low insertion loss can be manufactured by using the low precision ferrule.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. An alignment system for calibrating a position of an optical fiber in a bore of a ferrule, comprising:
    a calibration ferrule having an alignment guide hole formed therein;
    an alignment guide element configured to calibrate a center position of a guide hole of the ferrule, so that a center of the guide hole of the ferrule is aligned with a center of the alignment guide hole;
    a fiber core alignment element comprising a fiber core having a center positioned at a theoretical center relative to a positioning reference defined by the center of the alignment guide hole;
    an optical vision system configured to identify a center position of a fiber core of the optical fiber and the center position of the fiber core of the respective fiber core alignment element; and
    a controlling and moving system configured to actively adjust the position of the optical fiber in the bore of the ferrule under guide of the optical vision system, so that the center of the fiber core of the optical fiber is aligned with the center of the fiber core of the respective fiber core alignment element, and so that the center of the fiber core of the optical fiber is positioned at a theoretical center relative to a positioning reference defined by the center of the guide hole of the ferrule,
    wherein the alignment guide element is configured to be a positioning rod; and two ends of the positioning rod are inserted into the alignment guide hole of the calibration ferrule and the guide hole of the ferrule, respectively.

2. The alignment system according to claim 1, wherein the ferrule comprises a plurality of bores each for receiving the respective optical fiber therein; and wherein the alignment system comprises a plurality of fiber core alignment elements corresponding to the optical fibers in the plurality of bores one by one, so as to calibrate the positions of the optical fibers in the bores, respectively.

3. The alignment system according to claim 2, wherein the plurality of fiber core alignment elements are arranged in one or more rows; and wherein centers of the fiber core alignment elements in each row of fiber core alignment elements are equally spaced from one another.

4. The alignment system according to claim 2, wherein the alignment guide element is fixed in the alignment guide hole of the calibration ferrule or integrally formed on the calibration ferrule.

5. The alignment system according to claim 2, wherein the fiber core alignment element is fixed in a bore of the calibration ferrule or integrally formed on the calibration ferrule.

6. The alignment system according to claim 1, wherein the optical vision system at least comprises:
  a first imaging device configured to pick up a first image of the optical fiber and the fiber core alignment element in a first direction perpendicular to an axis of the alignment guide element;
  a second imaging device configured to pick up a second image of the optical fiber and the fiber core alignment element in a second direction perpendicular to the axis of the alignment guide element and the first direction; and
  an image recognition device configured to recognize the center position of the fiber core of the optical fiber and the center position of the fiber core of the fiber core alignment element in the first image and recognize the center position of the fiber core of the optical fiber and the center position of the fiber core of the fiber core alignment element in the second image.

7. The alignment system according to claim 6, wherein the first imaging device comprises:
  a first light source provided at one side of the alignment guide element in the first direction; and
  a first camera provided at the other side, opposite to the first light source, of the alignment guide element in the first direction.

8. The alignment system according to claim 7, wherein the second imaging device comprises:
  a second light source provided at one side of the alignment guide element in the second direction; and
  a second camera provided at the other side, opposite to the second light source, of the alignment guide element in the second direction.

9. The alignment system according to claim 6, wherein the image recognition device comprises an image processing system for processing the first image and the second image.

10. The alignment system according to claim 8, wherein an end of the optical fiber protrudes from an end surface of the ferrule,
  wherein an end of the fiber core alignment element protrudes from an end surface of the calibration ferrule, and faces and is spaced from the end of the optical fiber.

11. The alignment system according to claim 10, wherein the first imaging device and the second imaging device are configured to pick up images of the ends, facing to and spaced from each other, of the optical fiber and the fiber core alignment element.

12. The alignment system according to claim 10, wherein the controlling and moving system comprises:
  a manipulator having a gripper for gripping the optical fiber; and
  a closed loop feedback control system configured to adjust a position of the gripper until an error, detected by the optical vision system, between the center position of the fiber core of the optical fiber and the center position of the fiber core of the fiber core alignment element is equal to zero or within a predetermined range.

13. The alignment system according to claim 12, wherein the predetermined range is a range of −0.001 mm~0.001 mm.

14. The alignment system according to claim 13, wherein the predetermined range is a range of −0.3 μm~0.3 μm.

15. A method of calibrating a position of an optical fiber in a bore of a ferrule, comprising steps of:
  providing a calibration ferrule with an alignment guide hole, an alignment guide element and a fiber core alignment element, wherein a center of a fiber core of the fiber core alignment element is positioned at a theoretical center relative to a positioning reference defined by a center of the alignment guide hole;
  calibrating a center position of a guide hole of the ferrule with the alignment guide element, so that the center of the guide hole of the ferrule is aligned with the center of the alignment guide hole; and
  actively adjusting the position of the optical fiber in the bore of the ferrule under guide of an optical vision system, so that a center of a fiber core of the optical fiber is aligned with the center of the fiber core of the respective fiber core alignment element,
  wherein the alignment guide element is configured to be a positioning rod; and two ends of the positioning rod are inserted into the alignment guide hole of the calibration ferrule and the guide hole of the ferrule, respectively.

16. The method according to claim 15,
  wherein the ferrule comprises a plurality of bores each for receiving the respective optical fiber therein; and
  wherein the method further comprises providing a plurality of fiber core alignment elements corresponding to the optical fibers in the plurality of bores one by one, so as to calibrate the positions of the optical fibers in the respective bores.

17. The alignment system according to claim 12, wherein the error comprises:
  a first error, detected by the optical vision system, between the center position of the fiber core of the optical fiber and the center position of the fiber core of the fiber core alignment element in the first image; and
  a second error, detected by the optical vision system, between the center position of the fiber core of the optical fiber and the center position of the fiber core of the fiber core alignment element in the second image.

18. An alignment system for calibrating a position of an optical fiber in a bore of a ferrule, comprising:
  an alignment guide element configured to be a positioning rod, two ends of the positioning rod being inserted into an alignment guide hole of a calibration ferrule and a guide hole of the ferrule, respectively;
  a fiber core alignment element comprising a fiber core having a center positioned at a theoretical center relative to a positioning reference of the ferrule;
  an optical vision system configured to identify a center position of a fiber core of the optical fiber and the center position of the fiber core of the respective fiber core alignment element; and
  a controlling and moving system configured to actively adjust the position of the optical fiber in the bore of the ferrule under guide of the optical vision system, so that the center of the fiber core of the optical fiber is aligned with the center of the fiber core of the respective fiber core alignment element.

19. The alignment system according to claim 18,
  wherein the positioning reference is defined by the center of the alignment guide hole;

wherein the optical vision system is configured to identify a center position of the alignment guide hole in the calibration ferrule and a center position of a guide hole in the ferrule; and wherein the controlling and moving system is configured to actively adjust the center position of the guide hole in the ferrule under guide of the optical vision system, so that the center of the guide hole in the ferrule is aligned with the center of the alignment guide hole in the calibration ferrule, and actively adjusting the position of the optical fiber in the bore of the ferrule under guide of the optical vision system, so that the center of the fiber core of the optical fiber is aligned with the center of the fiber core of the respective fiber core alignment element, and so that the center of the fiber core of the optical fiber is positioned at the theoretical center relative to a positioning reference defined by the center of the guide hole of the ferrule.

\* \* \* \* \*